United States Patent [19]

Cha et al.

[11] E Re. 31,358

[45] Reissued Aug. 23, 1983

[54] JET DROP PRINTER WITH ELEMENTS BALANCED ABOUT SUPPORT PLATE IN NODAL PLANE

[75] Inventors: Charles L. Cha, Xenia; George W. Denlinger, Stringboro; David N. Pipkorn, Centerville; Elias Spyrou, Dayton, all of Ohio

[73] Assignee: The Mead Corporation, Dayton, Ohio

[21] Appl. No.: 246,508

[22] Filed: Mar. 23, 1981

Related U.S. Patent Documents

Reissue of:

[64] Patent No.: 4,198,643
Issued: Apr. 15, 1980
Appl. No.: 970,473
Filed: Dec. 18, 1978

[51] Int. Cl.[3] ..... G01D 15/18

[52] U.S. Cl. ..... 346/75; 346/140 R

[58] Field of Search ..... 346/75, 140 IJ

[56] References Cited

U.S. PATENT DOCUMENTS

| | | | |
|---|---|---|---|
| 3,400,892 | 9/1968 | Ensminger | 239/102 |
| 3,586,907 | 6/1971 | Beam et al. | 317/3 |
| 3,667,678 | 6/1972 | Haskell | 239/102 |
| 3,683,396 | 8/1972 | Keur et al. | 346/1 |
| 3,739,393 | 6/1973 | Lyon et al. | 346/1 |
| 3,927,410 | 12/1975 | Pimbley | 346/140 |
| 3,999,190 | 12/1976 | Brown et al. | 346/140 R |
| 4,005,435 | 1/1977 | Lundquist et al. | 346/1 |
| 4,012,745 | 3/1977 | Brown et al. | 346/75 X |
| 4,095,232 | 6/1978 | Cha | 346/75 |

FOREIGN PATENT DOCUMENTS

| | | |
|---|---|---|
| 1293980 | 10/1972 | United Kingdom . |
| 1500908 | 2/1978 | United Kingdom . |

*Primary Examiner*—George H. Miller, Jr.
*Attorney, Agent, or Firm*—Biebel, French & Nauman

[57] ABSTRACT

[a] *A* jet drop printer includes a reservoir means defining an ink receiving manifold and an orifice means defining a plurality of orifices communicating with the manifold. A plurality of continuously flowing ink streams emerge from the orifices as ink is applied to the manifold under pressure. A drop control means control the trajectories of drops which break off from the streams such that drops are selectively deposited upon a print medium. A support plate supports the reservoir means and the orifice means and is held by a support structure. Piezoelectric transducers are also supported by the support plate and vibrate at a frequency near the natural frequency of the streams, thus causing drops of uniform size and spacing to break off from the streams. A reaction mass is supported by the support plate and is positioned relative to the transducers, the reservoir means and the orifice means such that a vibrational nodal plane passes through the support plate. The support structure is thereby mechanically decoupled from vibrations impressed upon the other elements of the printer.

10 Claims, 7 Drawing Figures

JET DROP PRINTER WITH ELEMENTS BALANCED ABOUT SUPPORT PLATE IN NODAL PLANE

Matter enclosed in heavy brackets [ ] appears in the original patent but forms no part of this reissue specification; matter printed in italics indicates the additions made by reissue.

BACKGROUND OF THE INVENTION

The present invention relates to ink jet printing and, more particularly, to an improved scheme for mechanically stimulating ink fluid filaments to cause the filaments to break up into drop streams of substantially uniform drop size and interdrop spacing.

Jet printers of the type to which the present invention is directed operate by selectively depositing small drops of ink at predetermined points on a print medium to form a print image. The drops of ink are formed from fluid filaments which emerge from small orifices communicating with an ink fluid reservoir in which ink is maintained under pressure. Each fluid filament tends to break apart at its tip to form a stream of ink drops. If no mechanical stimulation were applied, the drops would tend to be somewhat irregular in size and spacing within the stream. As will be appreciated, in order for an image of high resolution to be formed upon a print medium by selective deposition of the ink drops, it is necessary for the drops to be substantially uniform in size and for the interdrop spacing within the stream to be substantially uniform.

One technique utilized to enhance the regularity of drop size and spacing is to position the orifices in a relatively thin, flexible wall of the fluid reservoir. This wall, termed the "orifice plate," is then stimulated mechanically, causing a series of bending waves to travel along the wall. Such a stimulation technique is shown in U.S. Pat. No. 3,739,393, issued June 12, 1973, to Lyon et al in which dampers are positioned at each end of the orifice plate to reduce reflection of the bending waves. This technique, known as traveling wave stimulation, results in substantially uniform drop size and spacing. In a multiple jet printer using this technique, break up of drops along the print head will occur at various times, as the bending waves travel along the orifice plate. The formation of drops in each stream in such a printer is out of phase with respect to the formation of drops in the other streams. Additionally, the selection of orifice plate material for such a printer is drastically limited, since the plate must be sufficiently flexible in order to transmit the bending waves along the complete extent of the print head with sufficient amplitude.

Another approach to stimulation of jet drop break up is shown in U.S. Pat. No. 3,586,907, issued June 22, 1971, to Beam et al. This patent shows a printer in which the entire print head, including the ink manifold structure and orifice plate, is mechanically stimulated together. Such an arrangement will necessarily fatigue the print head mounting structure, since this structure will also experience the vibrations applied to the manifold and orifice plate.

A further approach to filament stimulation is disclosed in U.S. Pat. No. 4,095,232, issued June 13, 1978, to Cha. Using the technique disclosed in this patent, stimulators mounted in the upper portion of the fluid reservoir generate pressure waves which are transmitted downward through the fluid in the reservoir into the individual fluid filaments. Each stimulator includes a pair of piezoelectric crystals which vibrate in phase and which are mounted on opposite sides of a mounting plate which is coincident with a nodal plane. A reaction mass is positioned at the opposite end of the stimulator from a stimulation member which is coupled to the fluid. The reaction mass insures that the nodal plane is properly positioned. Such fluid coupled stimulation may, however, result in reflected plane waves from the orifice plate or other structure, which waves may limit in some instances the stimulation effectiveness of the arrangement.

Another stimulation technique is suggested in U.S. Pat. No. 3,667,678, issued June 16, 1972, to Haskell. In the Haskell patent, a nozzle structure is disclosed in which a relatively long tube defining the nozzle is supported at nodal points. The nozzle is stimulated by means of a magneto-strictive stimulator arrangement. The ink reservoir communicating with the tube, however, is fixed and the magneto-strictive stimulator arrangement is mounted by a separate mounting structure from that supporting the tube. The reaction force applied to the stimulator arrangement will, therefore, be coupled to other [part] *parts* of the system through the stimulator support structure.

In U.S. Pat. No. 3,927,410, issued Dec. 16, 1975, to Pimbley, a nozzle, a vibrating means, and a reaction mass, are commonly supported for co-operative vibration. The supporting structure includes a rubber damper which is apparently not located at a nodal plane. Thus, while the rubber damper may reduce the amplitude of the vibrations transmitted to the rest of the printer, these vibrations will not be completely eliminated.

U.S. Pat. No. 3,683,396, issued Aug. 8, 1972, to Keur et al., discloses an ink jet system in which the length a tube shaped nozzle is selected such that it is in odd multiple of a quarter wave length of the frequency of vibration of the fluid in the nozzle. This configuration is said to optimize transmission of energy to the print fluid. The support structure for the nozzle, however, is not disclosed.

It should be appreciated that the above-referenced Haskell, Pimbley, and Keur et al patents all relate to stimulation of a single jet, which is much simpler to accomplish than multiple jet stimulation. In a multiple jet printer, vibrations transmitted through the mounting structure may affect stimulation of various ones of the jets, thus producing non-uniformity in the effectiveness of jet stimulation.

Accordingly, there is a need for a simple effective stimulator for an ink jet printer in which the mechanical vibrations applied to the fluid filaments are effectively decoupled from the printer support structure.

SUMMARY OF THE INVENTION

A jet drop printer includes a reservoir means defining an ink receiving manifold and an orifice means defining a plurality of orifices which communicate with the manifold. The orifices produce a plurality of continuously flowing ink streams which emerge therefrom as ink is applied to the manifold under pressure. Drop control means control the trajectories of the drops which break off from the streams. A support plate for supporting the reservoir means and the orifice means is, in turn, supported by support structure. A vibrating means, supported by the support plate, vibrates the reservoir means and the orifice means at a frequency near the natural frequency of the streams, thereby causing drops to be generated from the streams which are substantially uniform in size. A reaction mass is supported by the support plate and is positioned relative to the vibrating means, the reservoir means, and the orifice means such that a vibrational nodal plane passes through the support plate. The support structure is thereby mechanically decoupled from the mechanical vibrations impressed upon the other elements of the printer.

The vibrating means may comprise a pair of piezoelectric transducers which are mounted on opposite sides of the support plate. The reservoir means is mounted against one of the pair of piezoelectric transducers on the side of the transducer opposite the support plate, while the reaction mass is mounted in contact with the other of said pair of piezoelectric transducers on the opposite side of the other transducer from the support plate. A connector means engages both the reservoir means and the reaction mass and extends through central openings in the pair of piezoelectric transducers and the support plate to clamp the piezoelectric transducers and the support plate between the reaction mass and the fluid reservoir. An insulator means electrically insulates the connector means from the piezoelectric transducers and the support plate. A fluctuating electrical potential is applied between the support plate and the reaction mass and between the reservoir means and the support plate whereby the vibrating means is electrically stimulated to vibrate at a frequency near the natural frequency of the streams.

Accordingly, it is an object of the present invention to provide a mechanical stimulator mounting arrangement for a jet drop printer in which the vibrations produced by the stimulator arrangement are effectively decoupled from the printer support structure; to provide such a printer in which a stimulator, fluid reservoir, and reaction mass are mounted upon a support plate, which plate is positioned in a vibrational nodal plane; and to provide such a printer in which the fluid reservoir and the orifice plate communicating with the reservoir are mechanically stimulated.

DETAILED DESCRIPTION OF THE PREFERRED EMBODIMENT

Figure 1:
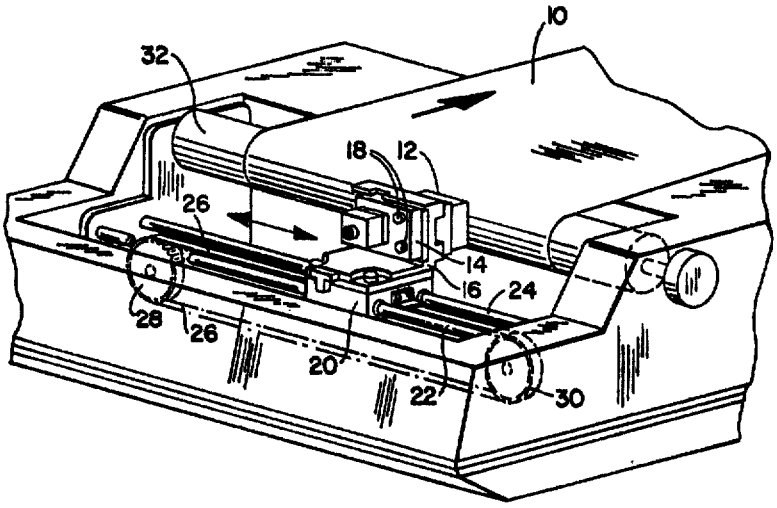
FIG. 1 is a partial perspective view of a printer constructed according to the present invention.

FIG. 1 is a perspective view illustrating a printer constructed according to the present invention. A print medium, such as a web of paper 10, is provided for receiving ink drops thereon generated by print head 12. The ink drops are deposited at selected points on the print medium 10 to form collectively a print image.

Support structure for the print head includes a mounting plate 14 which is attached to bracket 16 by threaded bolts 18. Bracket 16, is in turn, attached to support member 20 which slidably engages shafts 22 and 24. The construction of the print head support structure is illustrated only generally in FIG. 1, with a number of bolts being omitted from the structure for the sake of clarity. This structure is shown more completely in the balance of the figures.

Timing belt 26 extends around drive pulley 28 and idler pulley 30 and is attached to support member 20. As drive pulley 28 is rotated by a motor drive arrangement (not shown), the print head and associated mounting elements are translated along shafts 22 and 24, as indicated.

As described more completely below, print head 12 generates a plurality of jet streams of ink drops which are arranged in a row which is perpendicular to the direction of movement of the print head. Selected drops strike the print web 10, collectively forming a line of alpha numeric characters or other desired print image across the print web 10. A web drive means (not shown), attached to web roller 32, periodically rotates after printing of each line such that the next successive line may be printed.

Figure 3:
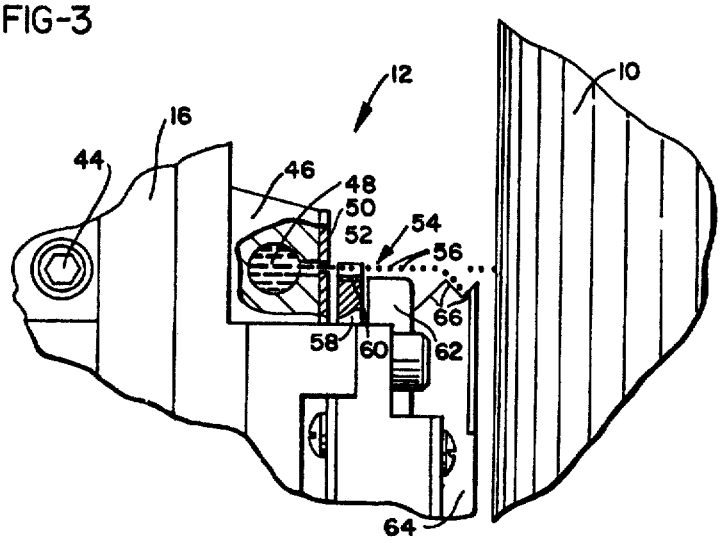
FIG. 3 is an enlarged plan view, similar to FIG. 2, with portions broken away and in section.
Figure 2:
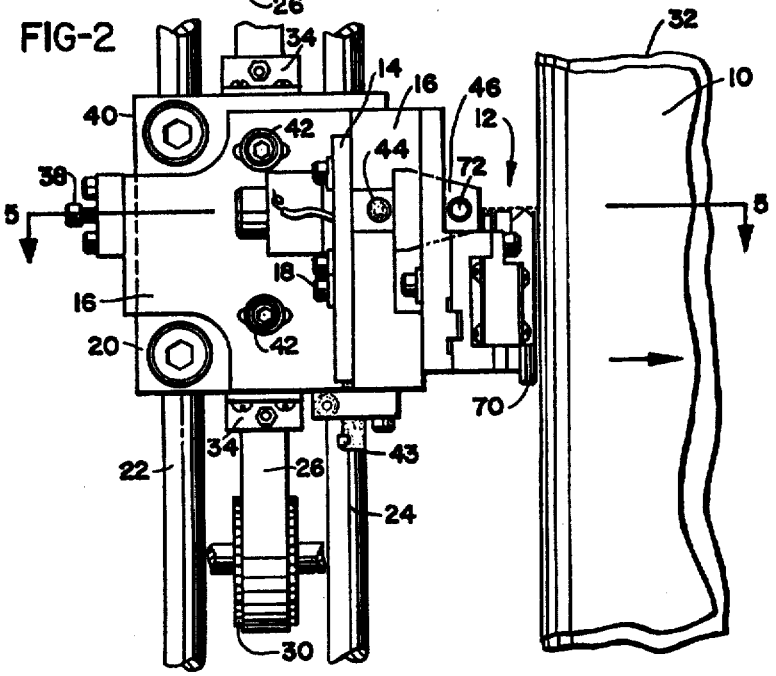
FIG. 2 is a plan view of the printer of FIG. 1.

Reference is now made to FIGS. 2 and 3, which are plan views illustrating the construction of the print head in greater detail. As seen in FIG. 2, timing belt 26 is connected to support member 20 by means of brackets 34. Idler pulley 30 defines a series of teeth about its periphery which mesh with the grooved inner surface of the belt 26. Similarly, drive pulley 28 defines a plurality of teeth which positively engage timing belt 26.

Figure 4:
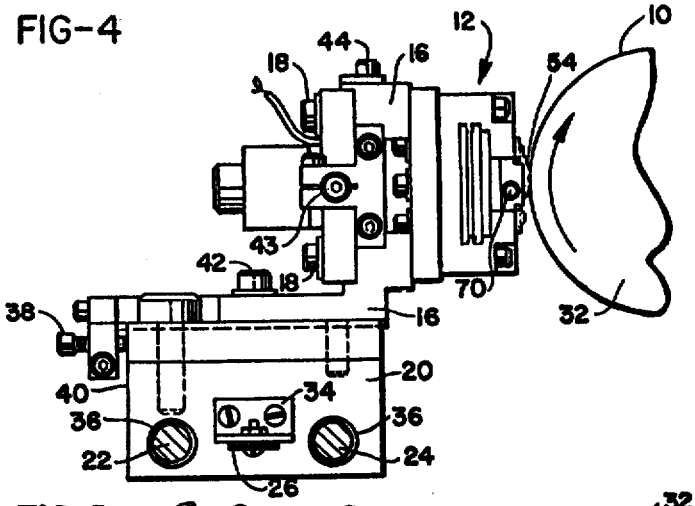
FIG. 4 is a side view of a portion of the printer of FIG. 1, as seen looking from right to left in FIG. 1.

As seen in FIG. 4, brass bearings 36 in member 20 surround shafts 22 and 24 and permit the member 20 and the supported print head elements to be translated along the shafts by the timing belt 26. Other sliding support arrangements, including for instance rollers, could be used to engage shafts 22 and 24 in place of bearings 36. Bracket 16 is precisely positioned on member 20 by means of adjustable screw 38 which locates against surface 40. Bolts 42 are provided to secure bracket 16 to member 40. Print head 12 is positioned on bracket 16 by means of adjustable locating screw 43. Bolts 18 and 44 secure print head 12 to bracket 16.

As seen in FIG. 3, a fluid reservoir means 46 defines an ink receiving manifold 48 therein. An orifice plate 50 is mounted on the reservoir means 46 and has a plurality of orifices 52 which communicate with the manifold 48. A plurality of continuously flowing ink streams emerge from the orifices [53] *52* as ink is applied to the manifold 48 under pressure. The ink streams are arranged along a row which is perpendicular to the plane of the drawing of FIG. 3, such that only one such stream is seen. The row of streams 54 are illustrated in FIG. 4. An ink filament extending from orifice 52, when stimulated mechanically at a frequency close to its natural frequency of drop formation, tends to break up into a series of uniformly sized drops 56.

Charge plate 58 defines a plurality of notches along one edge, with each such notch plated with an electrically conductive material 60 and aligned with a respective one of the streams emerging from the orifice plate 50. Conductive material 60 is connected to charge control circuitry which may comprise a digital computer via an electrical connector. The charge control circuitry supplies a series of charge signals to the material 60 to induce selective charging of the drops which are formed from the ends of the fluid stream. The mechanism by which this is accomplished is disclosed more completely in U.S. Pat. No. 3,701,998, issued Oct. 31, 1972, to Mathis.

The trajectory of the drops 56, thus formed, extends past a deflection electrode 62. As described more completely in U.S. Pat. No. 3,656,171, issued Apr. 11, 1972, to Robertson, charged drops induce a corresponding charge of opposite polarity on the surface of grounded, electrically conductive deflection electrode 62, with the result that the drops which are charged tend to be deflected toward the electrode 62. Thus the charged drops will assume a trajectory which causes them to strike the catching surface of catcher 64.

Figure 5:
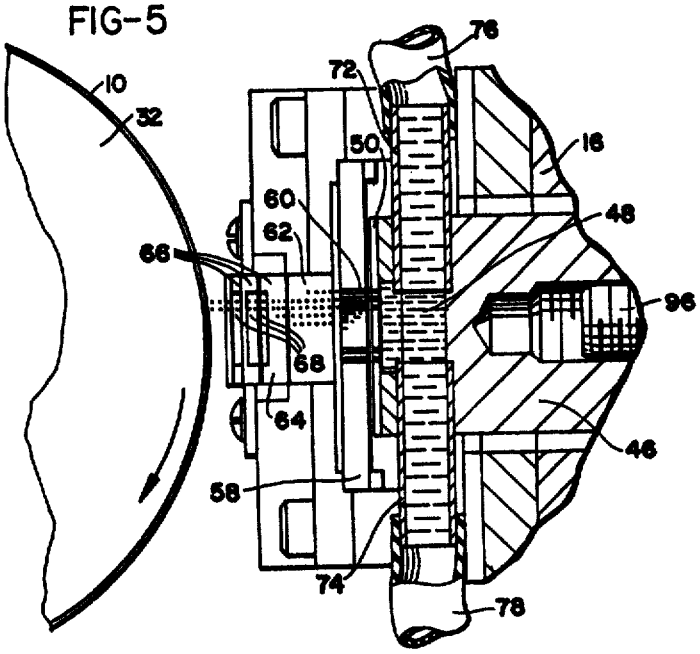
FIG. 5 is a sectional view taken generally along line 5—5 in FIG. 2.

As seen more completely in FIG. 5, the catching surface 66 of catcher 64 defines a plurality of slots 68 into which drops striking the catcher 64 are ingested. Catcher 64 defines an evacuated cavity into which the caught drops are drawn by means of a vacuum applied through vacuum fitting 70 (FIG. 4). The uncharged drops, however, pass the catcher 64 and strike the print medium 10 at selected points thereon as the print head 12 is moved across the print medium 10.

As seen in FIG. 5, fittings 72 and 74 communicate with manifold 48. Ink is supplied to manifold 48 from an ink supply (not shown) by flexible tube 76. Additionally, a flush fluid may be supplied through tube 76 to the manifold 48 when it is desired to clean the manifold, such as when the printer is being shut down. Ink or flush fluid may be removed from the manifold through fitting 74 via flexible tube 78. Tubes 76 and 78 are sufficiently flexible such that they do not affect substantially the mechanical stimulation of the reservoir means 46 and orifice means 50, as described below.

Figure 6:
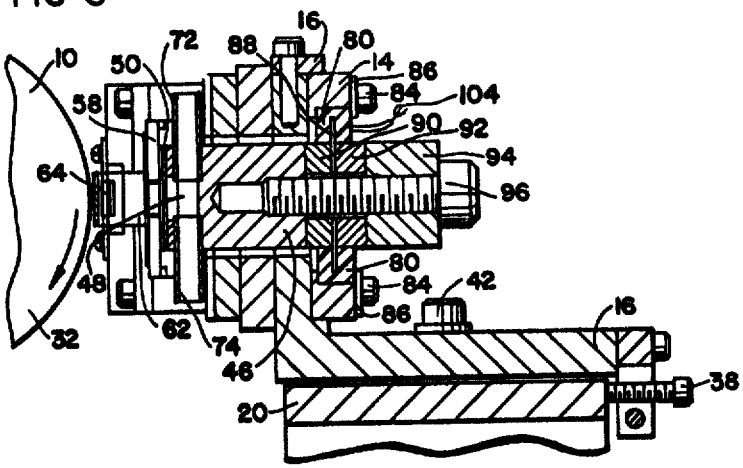
FIG. 6 is an enlarged sectional view, similar to FIG. 5.
Figure 7:
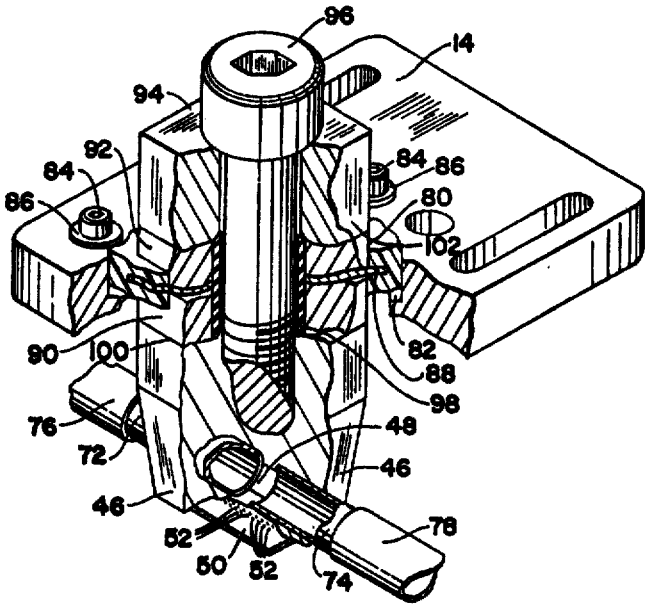
FIG. 7 is an enlarged perspective view of the stimulation elements, with portions broken away.

Reference is now made to FIGS. 6 and 7 which illustrate the stimulation arrangement by which the fluid streams passing through orifices in the orifice plate 50 are stimulated to break up into ink drops of uniform size and spacing. The print head support structure includes plate 14 which is attached to bracket 16. Additionally, the print head support structure includes a non-conductive mounting disc 80 which is held within recess 82 in plate 14 by means of threaded bolts 84 and washers 86. Disc 80 defines an annular groove in which is positioned a flexible, electrically conductive electrode 88. Disc 80 electrically insulates the electrically conductive electrode 88 from the plate 14. Electrode 88 acts as a support plate for supporting a vibrating means, including piezoelectric transducers 90 and 92 which are positioned on opposite sides of the electrode 88.

Electrode 88 additionally supports the reservoir means 46 and the orifice means 50, as well as a reaction mass 94. The fluid reservoir means 46 is mounted adjacent the first piezoelectric transducer 90 on the side of the transducers 90 opposite the flexible electrode 88. Similarly, the reaction mass 94 is mounted on the second piezoelectric transducer 92 on the opposite side of the electrode 88 from the fluid reservoir means 46. It should be understood that the fluid reservoir means 46, the transducers 90 and 92, and the reaction mass 94, are mounted solely by means of the electrode 88 and, with the exception of tubes 76 and 78, do not physically contact with the balance of the printer structure.

The ink in manifold 48 is electrically conductive and is received from an ink supply which is maintained at electrical ground potential. Reservoir means 46 is electrically conductive, as is reaction mass 94. An electrically conductive connector means, including threaded bolt 96, engages the reaction mass 94 and the reservoir means, and clamps the first and second piezoelectric transducers 90 and 92 therebetween. Bolt 96 extends through central openings in the transducers 90 and 92 and in electrode 88 and is electrically isolated from the transducers 90, 92 and electrode 88 by an insulator means comprising a non-conductive sheath 98. The reaction mass 94 and the reservoir means 46 thereby maintain surfaces 100 and 102 of the transducers 90 and 92, respectively, at ground potential.

Electrical conductor 104 (FIG. 6) provides a means for applying a fluctuating electrical potential to the electrode 88. Since surfaces 100 and 102 of the transducers 90 and 92 are grounded, the transducers will be electrically stimulated such that they will cyclically change thickness in response to fluctuations in the potential applied between electrode 88 and surfaces 102 and 100. The reaction mass 94, the reservoir means 46, and the orifice plate 50 will therefore be stimulated mechanically at the frequency of the fluctuating signal applied to conductor 104. The frequency of this signal is selected such that it corresponds to the natural frequency of fluid stream break up. The fluid streams emerging from orifices 52 and orifice plate 50 will, therefore, be stimulated to break up into drop streams consisting of drops of substantially uniform size which are evenly spaced apart.

The mass of reaction mass 94 is carefully selected such that the reaction mass 94 and the portion of the bolt 96 on the reaction mass side of the electrode 88 will provide an acoustic impedance close to that provided by reservoir means 46, orifice plate 50, fittings 72 and 74, and the ink within manifold 48. With such an arrangement, stimulation of transducers 90 and 92 produces opposing vibrations on opposite sides of the electrode 88 which tend to cancel each other in the plane of electrode 88, thereby forming a nodal plane. By this technique, the support structure of the print head is mechanically decoupled from the vibrations impressed upon the reservoir means 46 and orifice plate 50. The support structure, therefore, does not become fatigued from stimulation vibrations and the adjustment bolts for the print head are not vibrated out of their initial adjustment settings. Additionally, the print head transport mechanism operates smoothly, and overall stable operation is enhanced.

With the stimulation arrangement of the present invention the reservoir means 46, the ink within manifold 48, and the orifice plate are vibrated together. This results in stimulation which is substantially uniform along the row of jets. The ink filaments extending from the jets will therefore be substantially uniform in length, thus permitting accurate positioning of the charge plate 58 with respect to the filaments.

While the form of apparatus herein described constitutes a preferred embodiment of the invention, it is to be understood that the invention is not limited to this precise form of apparatus, and that changes may be made therein without departing from the scope of the invention.

What is claimed is:

1. An ink jet print head for generating a plurality of jet streams of ink drops, comprising:

print head support structure, a flexible electrically conductive electrode attached to said support structure, first and second piezoelectric transducer means positioned on opposite sides of said flexible electrically conductive electrode, respectively, fluid reservoir means mounted on said first piezoelectric transducer means, said fluid reservoir means defining an ink receiving manifold therein, an orifice plate connected to said reservoir means and, having a plurality of orifices communicating with said manifold, ink streams emerging from said orifices as ink is applied to said manifold, a reaction mass mounted on said second piezoelectric transducer means on the opposite side of said flexible electrically conductive electrode from said fluid reservoir means, and electrically conductive connector means engaging said reaction mass and said reservoir means and clamping said first and second piezoelectric transducer means and said flexible electrically conductive electrode therebetween, whereby a fluctuating electrical potential placed across each of said first and second piezoelectric transducer means results in mechanical stimulation of said fluid reservoir means and said reaction mass in respective opposite phase relationship, with the flexible electrically conductive electrode means being positioned in a nodal plane therebetween, said stimulation of said fluid reservoir means causing said streams to break up into drops of substantially uniform size and spacing.

2. The print head of claim 1 in which means are provided for applying a fluctuating electrical potential to said flexible electrically conductive electrode and in which said reaction mass and said fluid reservoir means are grounded, such that stimulation of said piezoelectric transducers occurs.

3. The print head of claim 1 in which said connector includes a threaded bolt extending through central openings in said first and second piezoelectric transducer means and said flexible electrically conductive electrode, said threaded bolt being electrically isolated from said first and second piezoelectric transducer means and said flexible electrode.

4. A jet drop printer, comprising:

reservoir means defining an ink receiving manifold, orifice means defining a plurality of orifices communicating with said manifold to produce a plurality of continuously flowing ink streams emerging from said orifices as ink is applied to said manifold under pressure, drop control means for controlling the trajectories of drops which break off from said streams, a support plate for supporting said reservoir means and said orifice means, support structure for supporting said support plate *and said drop control means,* vibrating means supported by said support plate for vibrating said reservoir means and said orifice means at a frequency near the natural frequency of said streams *without vibrating said drop control means*, thereby causing drops to be generated from said streams which are substantially uniform in size, and a reaction mass supported by said support plate and positioned relative to said vibrating means, said reservoir means, and said orifice means such that a vibrational nodal plane passes through said support plate, thereby mechanically decoupling said support structure from the vibrations impressed upon [the other elements of said printer] *said reservoir means and said orifice means.*

5. The printer of claim 4 further comprising means for applying a fluctuating electrical potential between said support plate and said reaction mass and between said reservoir means and said support plate, whereby said vibrating means is electrically stimulated to vibrate at a frequency near the natural frequency of said streams.

6. The printer of claim 4 in which said vibrating means comprises a pair of piezoelectric transducers mounted on opposite sides of said support plate.

7. The printer of claim 6 in which said reservoir means is mounted against one of said pair of piezoelectric transducers on the side of said transducer opposite said support plate.

8. The printer of claim 7 in which said [reservoir means] *reaction mass* is mounted in contact with the other of said pair of piezoelectric transducers on the opposite side of said other transducer from said support plate.

9. The printer of claim 8 further comprising connector means for engaging both said reservoir means and said reaction mass and extending through central openings in said pair of piezoelectric transducers and said support plate, whereby said piezoelectric transducers and said support plate are clamped between said reaction mass and said fluid reservoir.

10. The printer of claim 9 further comprising insulator means electrically insulating said connector means from said piezoelectric means and said support plate.

* * * * *